United States Patent
Kanno et al.

(10) Patent No.: US 11,366,277 B2
(45) Date of Patent: Jun. 21, 2022

(54) OPTICAL FIBER CABLE AND METHOD OF MANUFACTURING OPTICAL FIBER CABLE

(71) Applicant: Fujikura Ltd., Tokyo (JP)

(72) Inventors: Shuhei Kanno, Chiba (JP); Ryoichi Mitobe, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/106,734

(22) Filed: Nov. 30, 2020

(65) Prior Publication Data

US 2021/0231900 A1    Jul. 29, 2021

(30) Foreign Application Priority Data

Jan. 29, 2020   (JP) .............................. JP2020-012495

(51) Int. Cl.
    *G02B 6/44*        (2006.01)
(52) U.S. Cl.
    CPC .......... *G02B 6/4471* (2013.01); *G02B 6/443* (2013.01); *G02B 6/4479* (2013.01)
(58) Field of Classification Search
    CPC .. G02B 6/4463; G02B 6/3885; G02B 6/4471; G02B 6/3889; G02B 6/3887
    See application file for complete search history.

(56) References Cited

U.S. PATENT DOCUMENTS

| | | | | | |
|---|---|---|---|---|---|
| 4,801,191 A | * | 1/1989 | Nakai | .................. | G02B 6/3885 385/59 |
| 4,948,222 A | * | 8/1990 | Corke | .................. | G02B 6/3889 385/100 |
| 2011/0150398 A1 | * | 6/2011 | Zimmel | ............... | G02B 6/4466 385/81 |
| 2013/0183005 A1 | * | 7/2013 | Lu | ............................ | G02B 6/36 385/78 |
| 2015/0010282 A1 | * | 1/2015 | Yokochi | ............... | G02B 6/4435 385/102 |
| 2016/0147023 A1 | * | 5/2016 | Cox | ....................... | G02B 6/4476 385/86 |
| 2017/0212313 A1 | * | 7/2017 | Elenabaas | ............ | G02B 6/3869 |
| 2017/0227719 A1 | * | 8/2017 | Zimmel | ............... | G02B 6/3823 |
| 2019/0384007 A1 | * | 12/2019 | Matiss | ................. | G02B 6/1225 |

FOREIGN PATENT DOCUMENTS

JP    2006-267130 A    10/2006

* cited by examiner

*Primary Examiner* — Eric Wong
(74) *Attorney, Agent, or Firm* — Osha Bergman Watanabe & Burton LLP (57) ABSTRACT

An optical fiber cable includes: an optical fiber; a sheath that accommodates the optical fiber; a tension member that extends from an end portion of the sheath; a housing disposed at an end portion of the tension member; and an anchor portion disposed on the tension member. The anchor portion increases a projected area of the tension member when viewed from a longitudinal direction of the optical fiber cable, the anchor portion is inside the housing, and the housing is filled with a filler that fixes the anchor potion to the housing.

6 Claims, 8 Drawing Sheets

FIG. 7

OPTICAL FIBER CABLE AND METHOD OF MANUFACTURING OPTICAL FIBER CABLE

CROSS REFERENCE TO RELATED APPLICATION

The present application claims priority based on Japanese Patent Application No. 2020-012495 filed Jan. 29, 2020, the contents of which are incorporated herein by reference in their entirety.

BACKGROUND

Field of the Invention

The present invention relates to an optical fiber cable and a method of manufacturing an optical fiber cable.

Background Art

Japanese Unexamined Patent Application, First Publication No. 2006-267130 discloses a fixation method of fixing a tension member (steel wire) at an end portion of an optical fiber cable.

In this fixation method, the tension member extending from the end portion of the optical fiber cable is folded back, and the tension member is held by a side portion of the optical fiber cable.

In the conventional fixation method of a tension member as disclosed in Japanese Unexamined Patent Application, First Publication No. 2006-267130, the fixation of the tension member may be loosened by an operation of pulling or twisting the optical fiber cable. In addition, in order to prevent such loosening, skilled work is required when fixing the tension member and quality variations are likely to occur.

SUMMARY

One or more embodiments of the present invention provide an optical fiber cable or a method of manufacturing an optical fiber cable capable of stabilizing the fixation strength of a tension member.

An optical fiber cable according to one or more embodiments of the present invention includes an optical fiber, a sheath that accommodates the optical fiber, a tension member that partially extends from an end portion of the sheath, a housing that is arranged at an end portion of the tension member, and an anchor portion that is formed on the tension member which increases a projected area of the tension member when viewed from a longitudinal direction, where the anchor portion is located inside the housing, and a filler that fixes the anchor portion to the housing is filled inside the housing.

According to the above-described optical fiber cable, even if a large tension is applied to the tension member, the anchor portion acts as a stopper to prevent the tension member from coming off the housing. In addition, by hardening the filler with the anchor portion located inside the housing, the tension member can be easily fixed to the housing, so that the fixing strength of the tension member can be stabilized.

In an optical fiber cable according to one or more embodiments of the present invention, a material of the tension member may be Fiber Reinforced Plastics (FRP), and the anchor portion may be a plurality of branch portions formed by splitting the tension member along the longitudinal direction.

In an optical fiber cable according to one or more embodiments of the present invention, a number of the tension members may be at least two, a transverse member may be arranged so as to straddle the two tension members inside the housing, and the transverse member may be sandwiched between the branch portions of the respective tension members.

In an optical fiber cable according to one or more embodiments of the present invention, two lock members may be locked to each of the two tension members, and the two lock members may be arranged so as to sandwich the transverse member in the longitudinal direction.

In an optical fiber cable according to one or more embodiments of the present invention, the anchor portion may be formed by bending the tension member.

A method of manufacturing an optical fiber cable according to one or more embodiments of the present invention includes an insertion step of inserting a tension member into an insertion hole included in an housing, a processing step of forming an anchor portion that increases a projected area of the tension member viewed from a longitudinal direction by processing an end portion of the tension member, a transfer step of relatively transferring the tension member and the housing to position the anchor portion inside the housing, and a fixation step of injecting a filler into the inside of the housing and hardening the filler.

According to the above-described manufacturing method, since skillful work is hardly required, the fixation strength of the tension member can be stabilized.

According to one or more embodiments of the present invention, it is possible to provide an optical fiber cable or a method of manufacturing an optical fiber cable capable of stabilizing the fixation strength of a tension member.

DETAILED DESCRIPTION

First Embodiment

Hereinafter, an optical fiber cable of the first embodiment and a cable with a pulling tool including the optical fiber cable will be described with reference to the drawings.

Figure 1:
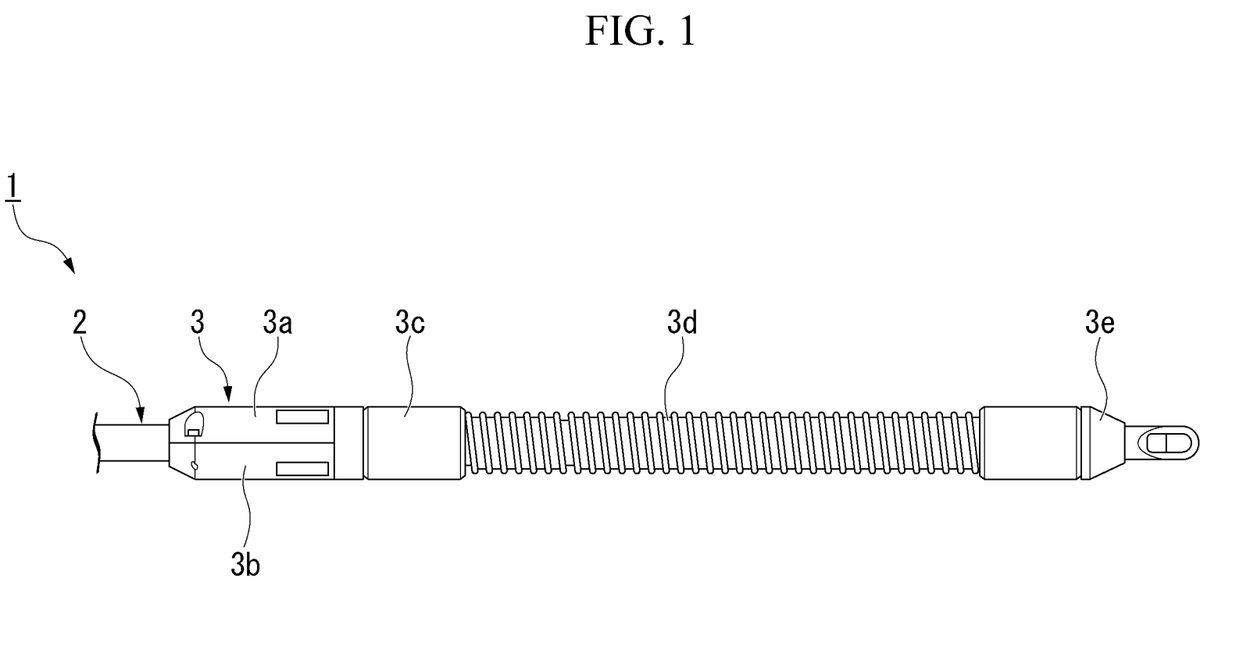
FIG. 1 is a diagram showing a cable with a pulling tool including the optical fiber cable according to the first embodiment.
Figure 2:
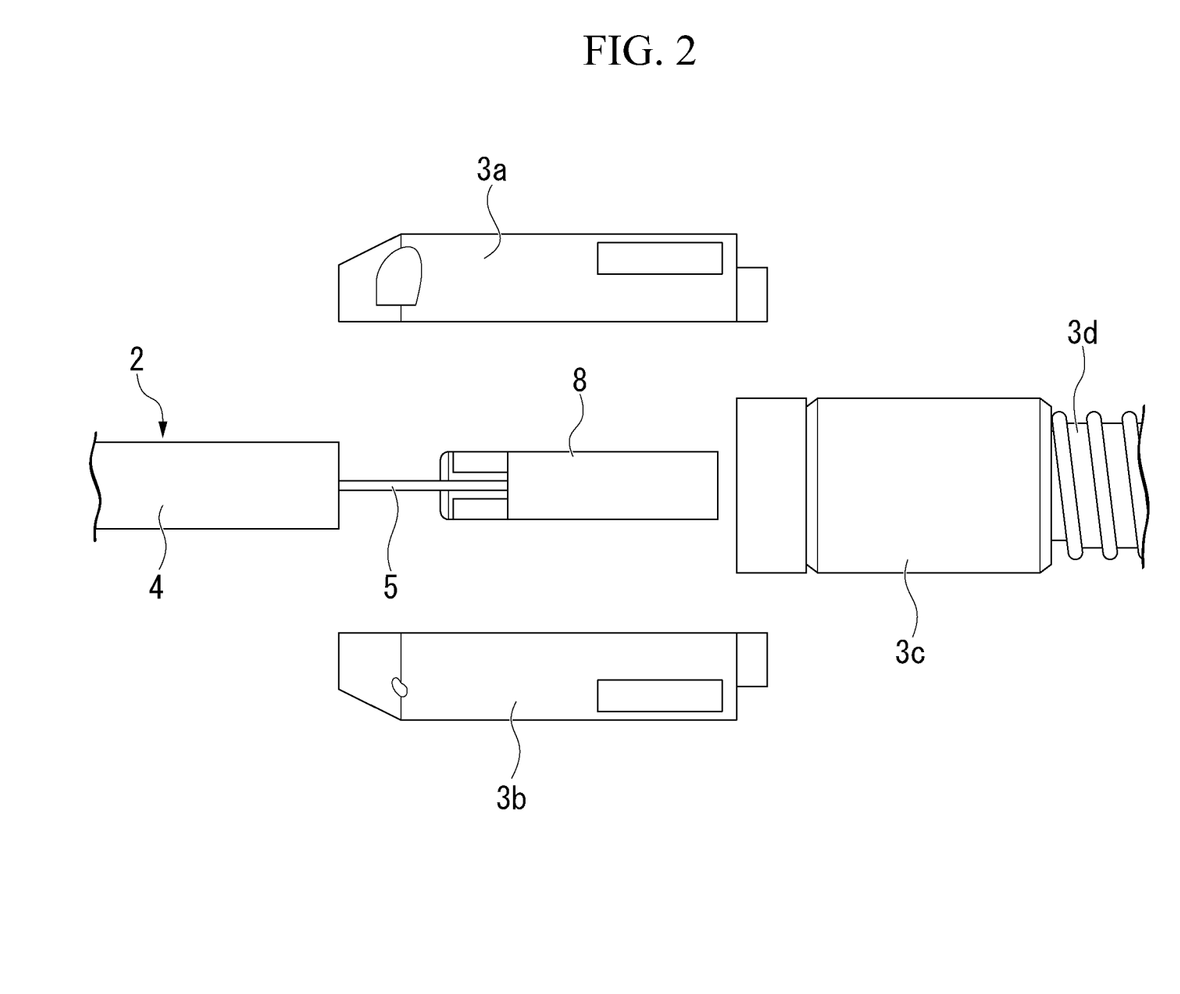
FIG. 2 is an exploded view of the holding member of FIG. 1.

As shown in FIG. 1, the cable 1 with a pulling tool includes an optical fiber cable 2 and a pulling tool 3. The pulling tool 3 is fixed to an end portion of the optical fiber cable 2. The pulling tool 3 includes clamps 3a and 3b, a coupler 3c, a flexible tube 3d, and a lock portion 3e. As shown in FIG. 2, the clamps 3a and 3b are separable from the coupler 3c. As shown in FIG. 1, the coupler 3c couples the clamps 3a and 3b to the flexible tube 3d. The flexible tube 3d has flexibility and is arranged between the coupler 3c and the lock portion 3e. A ring capable of locking a hook is formed at a tip of the lock portion 3e.

Figure 3:
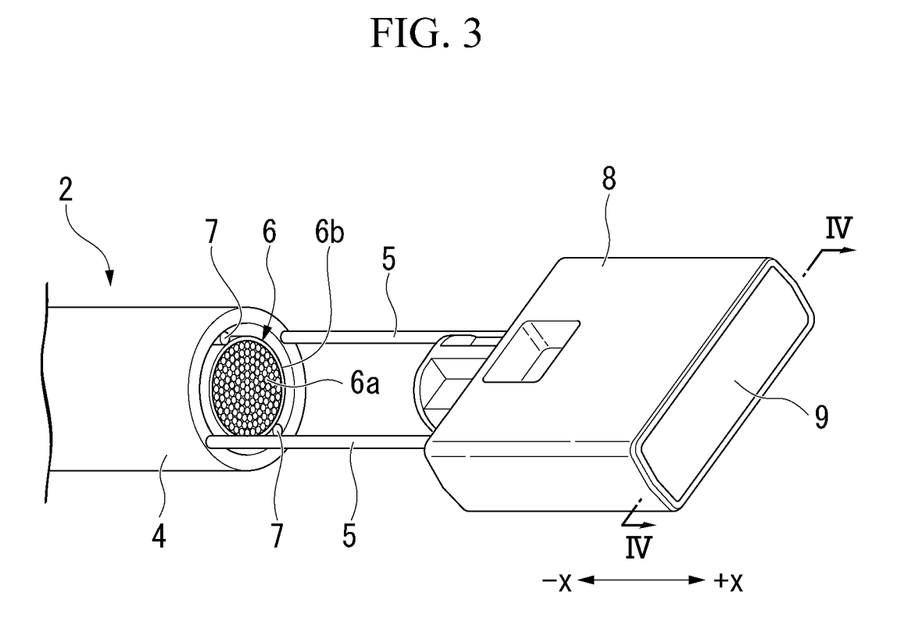
FIG. 3 is a perspective view around the housing of the optical fiber cable of FIG. 2.

As shown in FIGS. 2 and 3, the optical fiber cable 2 includes a sheath 4, two tension members 5, a core 6 including a plurality of optical fiber 6a, two lip cords 7, and a housing 8. The housing 8 is fixed to the pulling tool 3 by being sandwiched by the clamps 3a and 3b. The clamps 3a and 3b are fixed to the coupler 3c with screws or the like.

Definition of Direction

In the present embodiment, a longitudinal direction of the optical fiber cable 2 is simply referred to as the longitudinal direction, which is represented by the X axis in FIG. 3 and the like. In the longitudinal direction, the housing 8 side is referred to as a "tip side" (+X side), and the sheath 4 side is referred to as a "base end side" (−X side).

The sheath 4 is formed in a cylindrical shape and accommodates the core 6 and the lip cord 7. As the material of the sheath 4, a resin such as polyethylene (PE) or polyvinyl chloride (PVC) can be used. The core 6 includes a plurality of optical fibers 6a and a press winding 6b that wraps the optical fibers 6a. Although not shown, a portion of the optical fiber 6a extends from the end portion of the sheath 4 to the tip side. The extended portion (extra length portion) of the optical fiber 6a is arranged between the end portion of the sheath 4 and the housing 8 shown in FIG. 3. When connecting the optical fiber cable 2 to an optical communication circuit to be connected, the couplers 3a and 3b can be removed and the extra length portion of the optical fiber 6a can be connected to an optical fiber on the other side.

The lip cord 7 is used when tearing the sheath 4 and taking out the core 6. As the material of the lip cord 7, a string made of synthetic fiber such as polyester or aramid, or a cylindrical rod made of PP or nylon can be used. The number of lip cords 7 can be changed as appropriate, and the lip cords 7 may be omitted.

The tension member 5 is embedded in the sheath 4. The material of the tension member 5 of the present embodiment is Fiber Reinforced Plastics (FRP). Glass fibers or the like can be used as the fibers included in the FRP. In addition to FRP, a metal wire (for example, steel wire), a tensile strength fiber (for example, aramid fiber), or the like can be employed as the material of the tension member 5. Since the tensile strength fiber and the FRP have low conductivity, it is advantageous in that the tension member 5 does not need to be grounded. However, depending on the use of the optical fiber cable 2, grounding may be unnecessary even when a metal wire is used as the tension member 5.

The tension member 5 has a role of protecting the optical fiber 6a from tension. The number of the tension members 5 can be changed as appropriate and may be one or three or more. In addition, the location of the tension member 5 in the optical fiber cable 2 can be changed as appropriate. For example, the tension member 5 may be accommodated inside the sheath 4 or may be located inside the core 6.

As shown in FIG. 3, a portion of the tension member 5 extends from the end of the sheath 4 to the tip side. The housing 8 is attached to a portion of the tension member 5 extending from the end portion of the sheath 4. The housing 8 is hollow, and the inside of the housing 8 is filled with a filler 9. As the filler 9, any materials can be employed as long as the filler 9 can be poured into the housing 8 in a fluid state and can be hardened inside the housing 8. As a specific material of the filler 9, for example, an adhesive (acrylic resin adhesive, epoxy resin adhesive, urethane resin adhesive, or the like) or a resin (thermoplastic resin, thermosetting resin, ultraviolet hardening resin, and the like) can be mentioned.

Figure 4:
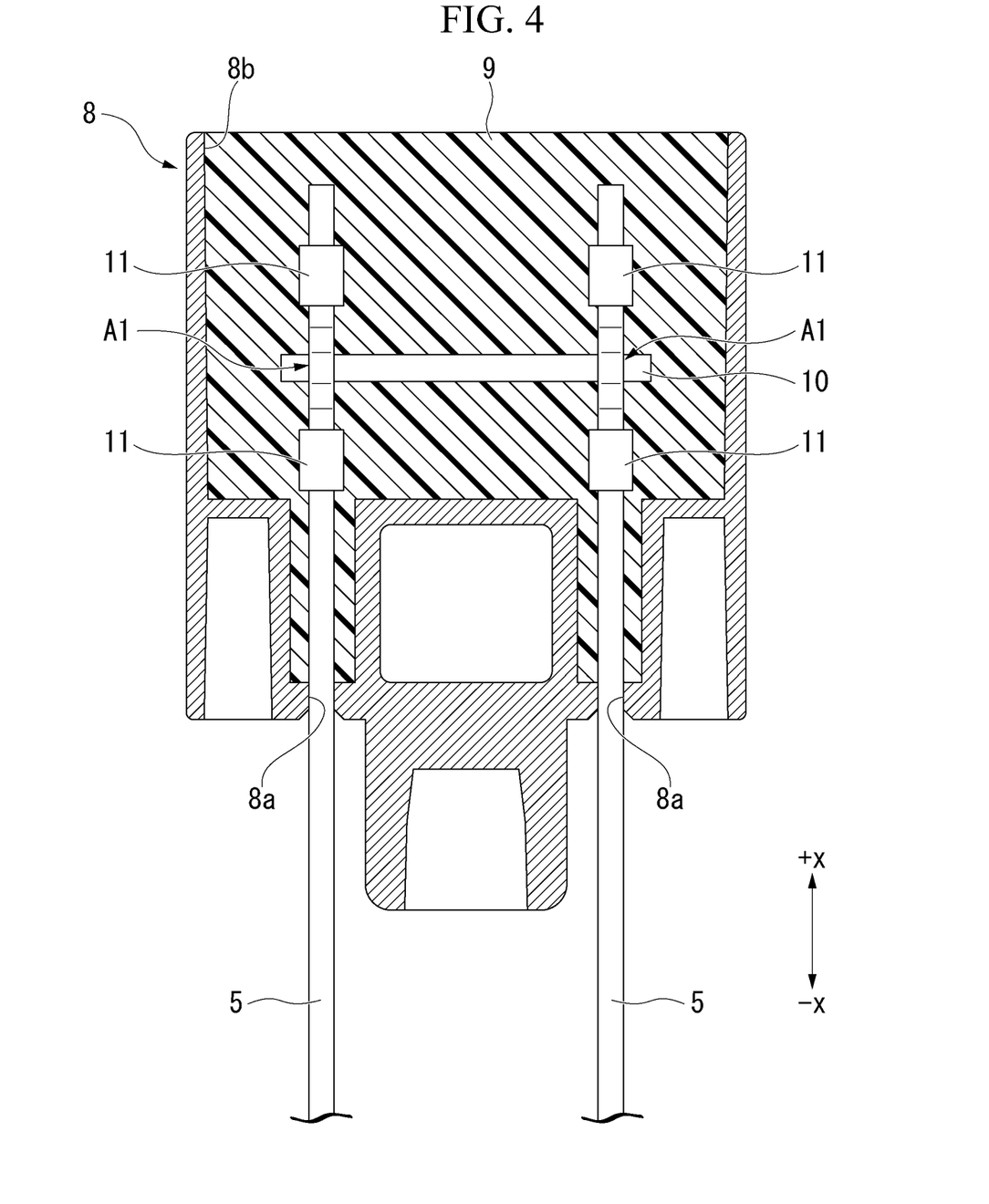
FIG. 4 is a sectional arrow view taken along the line IV-IV in FIG. 3.

As shown in FIG. 4, an opening 8b is formed at the end portion on the tip side of the housing 8. The end portion on the base end side of the housing 8 is closed except that two insertion holes 8a are formed. The number of insertion holes 8a can be appropriately changed according to the number of tension members 5.

As shown in FIG. 4, each tension member 5 is inserted into the housing 8 through the two insertion holes 8a. Here, at the end portion of the tension member 5 of the present embodiment, an anchor portion A1 that increases a projection area of the tension member 5 when viewed from the longitudinal direction is formed. Hereinafter, details of the anchor portion A1 will be described with reference to FIG. 5.

Figure 5:
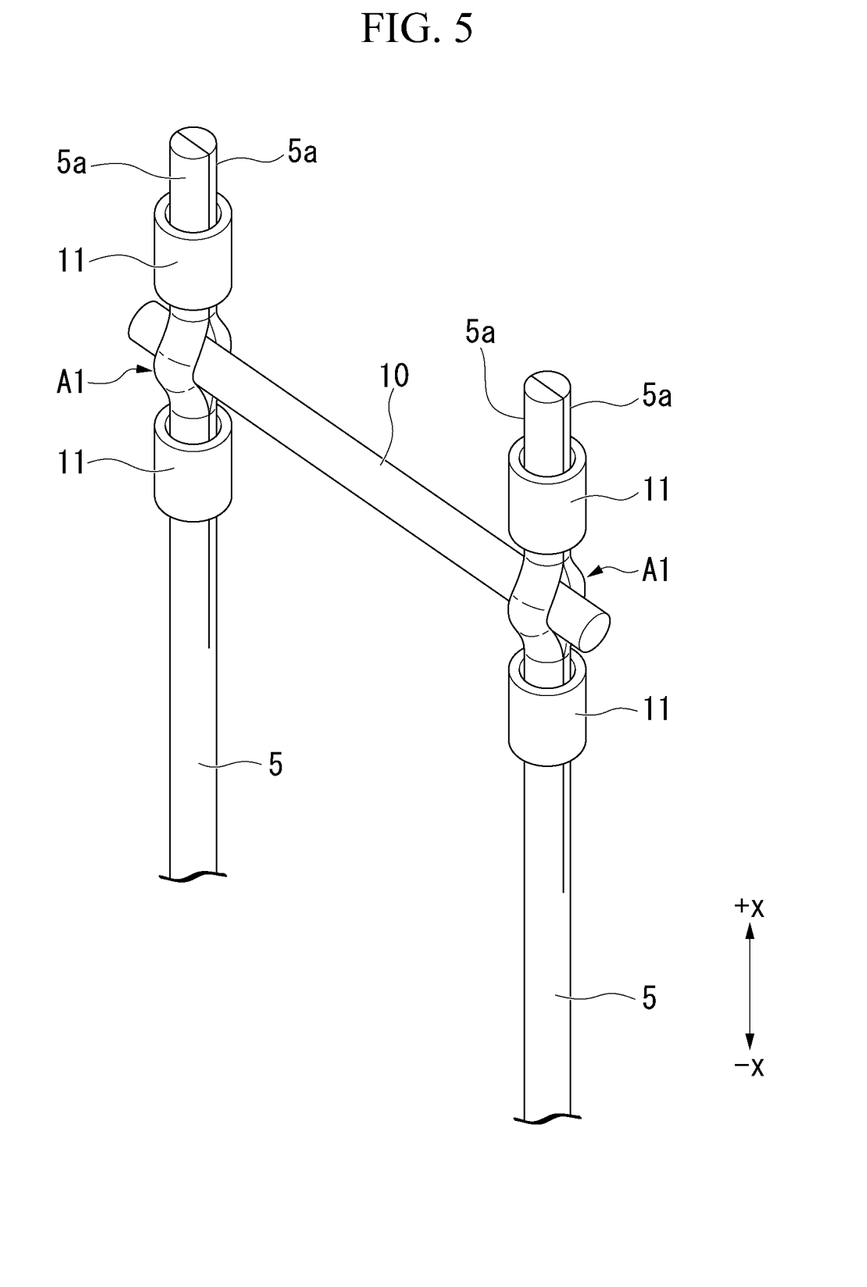
FIG. 5 is a perspective view in which the tension member and the transvers member of FIG. 4 are extracted.

As shown in FIG. 5, the end portion of each tension member 5 is split along the longitudinal direction and branched into two. That is, two branch portions 5a are formed at the end of each tension member 5. Both end portions of the transverse member 10 are sandwiched between the branched portions 5a included in each tension member 5. The transverse member 10 is arranged so as to straddle the two tension members 5. The material of the transverse member 10 may be the same as or different from the material of the tension member 5. Since the transvers member 10 is sandwiched between the branched portions 5a, the branched portion 5a has a shape that bulges outward. In such a manner, since the plurality of branch portions 5a of the tension member 5 bulge outward, the projection area of the tension member 5 when viewed from the longitudinal direction is increased as compared with the non-branched portion. That is, the anchor portion A1 of the present embodiment is a plurality of branch portions 5a. In addition, three or more branch portions 5a may be formed for one tension member 5.

As shown in FIG. 5, two lock members 11 are locked to each tension member 5. The two lock members 11 are arranged so as to sandwich the transverse member 10 in the longitudinal direction. Each lock member 11 is formed in a cylindrical shape and is fitted onto the tension member 5. The shape of the lock member 11 may be changed as appropriate. For example, the lock member 11 may be C-shaped when viewed from the longitudinal direction. In addition, the transverse member 10 and the lock member 11 may be omitted.

Next, an example of a method of manufacturing the optical fiber cable 2 configured as described above will be described. The following description is merely an example, and other manufacturing methods may be employed.

Figure 6A:
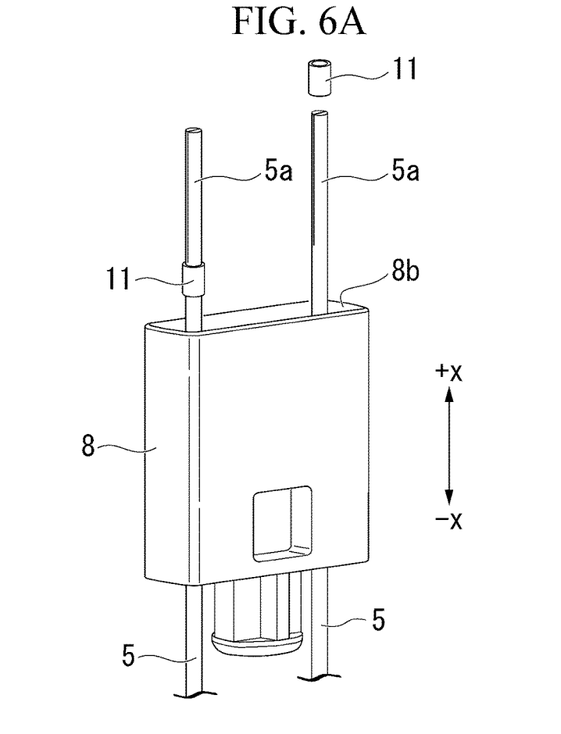
FIG. 6A is a diagram showing a method of manufacturing the optical fiber cable according to the first embodiment.

First, as shown in FIG. 6A, the tension member 5 is inserted into the insertion hole 8a (see FIG. 4) of the housing 8 (insertion step). In the inserting step, a portion of each tension member 5 is in a state of protruding toward the tip side through the opening 8b of the housing 8.

Figure 6B:
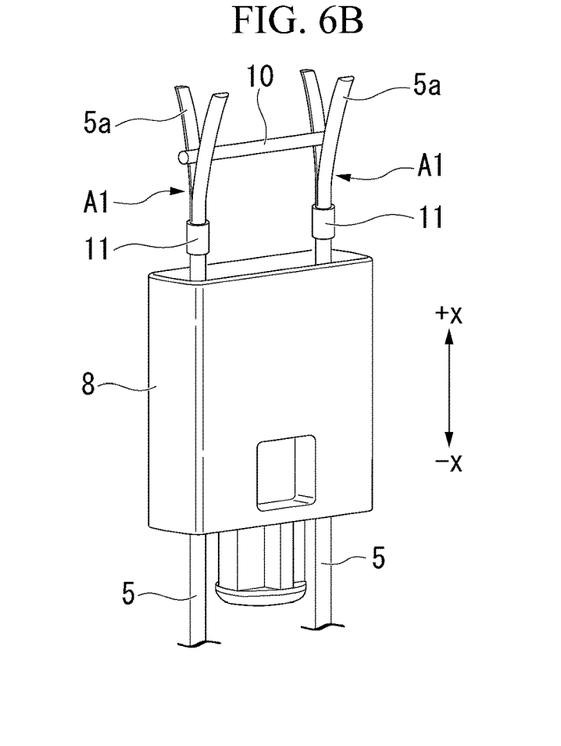
FIG. 6B is a diagram showing a step following FIG. 6A.

Next, the end portion of the tension member 5 is processed to form the anchor portion A1 (processing step). In the processing step of the present embodiment, the end portion of the tension member 5 is split along the longitudinal direction to form a plurality of branch portions 5a. Then, as shown in FIG. 6B, the traverse member 10 is sandwiched between the branch portions 5a. As a result, since the branch portion 5a has a shape that bulges outward, the projection area of the tension member 5 when viewed from the longitudinal direction is increased, and the anchor portion A1 is formed.

Note that the lock member 11 on the base end side may be locked to the tension member 5 before splitting each tension member 5, or may be locked after splitting. However, when the lock member 11 is locked before the tension member 5 is split, it is possible to prevent the tension member 5 from being split by accident more than necessary, and the operation of locking the lock member 11 is easy.

Figure 6C:
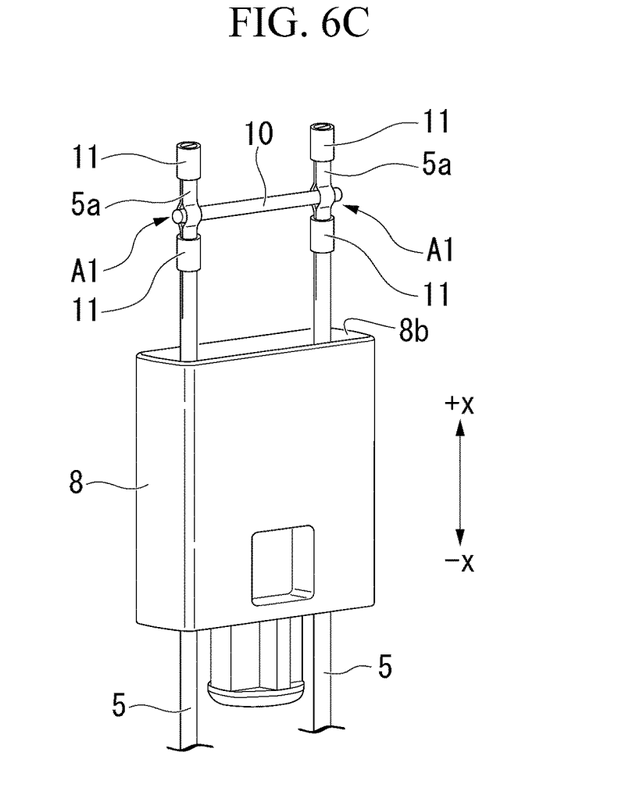
FIG. 6C is a diagram showing a step following FIG. 6B.

Next, as shown in FIG. 6C, the lock member 11 on the tip side is locked to each tension member 5. As a result, the plurality of branch portions 5a are bound by the lock member 11. In this state, since the shape of the branch portion 5a of each tension member 5 is restrained to some extent by the two lock members 11, it is possible to prevent the transverse member 10 from falling off from the branch portion 5a. That is, the lock member 11 has a role of temporarily fixing the transverse member 10 to the tension member 5.

Figure 6D:
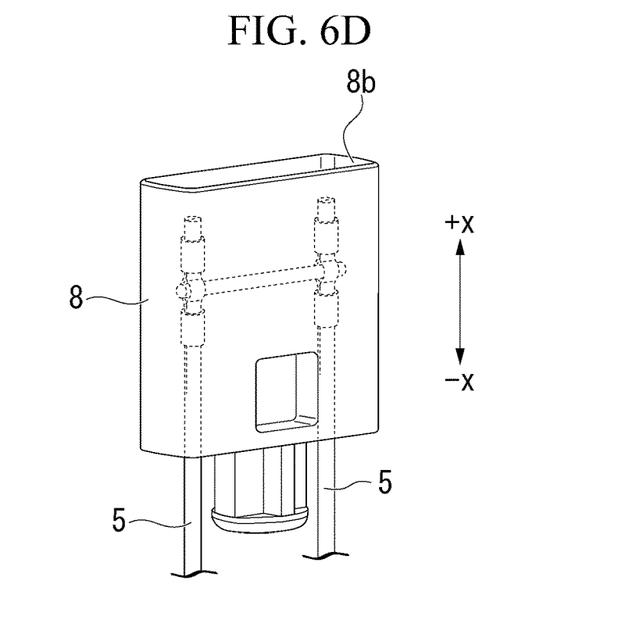
FIG. 6D is a diagram showing a step following FIG. 6C.

Next, as shown in FIG. 6D, the tension member 5 and the housing 8 are relatively transferred so that the anchor portion A1 is positioned inside the housing 8 (transfer step). More specifically, for example, the housing 8 may be gripped and the tension member 5 may be pulled toward the base end side (−X side). As a result, the tension member 5, the transverse member 10, and the lock member 11 are integrally housed inside the housing 8 through the opening 8b.

Next, the filler 9 before hardening is injected through the opening 8b. Then, by hardening the filler 9, the tension member 5, the transverse member 10, and the lock member 11 are fixed to the housing 8 (fixation step).

Next, the operations of the optical fiber cable 2 and the cable with a traction tool 1 configured as described above will be described.

The pulling tool 3 is used when laying the optical fiber cable 2 in a building or the like. In particular, the optical fiber cable 2 is pulled by grasping the traction tool 3 by hand or by locking the traction hook to the ring at the tip of the lock portion 3e so that the optical fiber cable 2 is placed inside a duct or the like. At this time, a large tension exceeding, for example, 9000 N acts on the optical fiber cable 2. In order to protect the optical fiber 6a from this tension, it is necessary to fix the traction tool 3 and the tension member 5 and receive tension by the tension member 5. On the other hand, since the tension member 5 is a linear member, it is necessary to devise so that the fixed portion with the pulling tool 3 does not come off.

Therefore, in the present embodiment, the configuration is employed such that the anchor portion A1 that increases the projected area of the tension member 5 viewed from the longitudinal direction is formed on the tension member 5, and the anchor portion A1 is fixed by the filler 9 inside the housing 8. When a large tension is applied to the tension member 5 in the longitudinal direction, the anchor portion A1 acts as a stopper. Furthermore, since the anchor portion A1 is formed, the contact area between the tension member 5 and the filler 9 increases as compared with the case where the anchor portion A1 is not provided. As a result, it is possible to prevent the tension member 5 from coming off from the filler 9 and the housing 8. Since the housing 8 is not a linear member, it is easy to stably fix the housing 8 to the pulling tool 3. Therefore, when the traction tool 3 is pulled with a strong force, the tension can be reliably transmitted to the tension member 5 via the housing 8 and the filler 9, and the optical fiber 6a can be protected from the tension.

As described above, the optical fiber cable 2 of the present embodiment includes an optical fiber 6a, a sheath 4 accommodating the optical fiber 6a, a tension member 5 partially extending from the end of the sheath 4, and a housing 8 arranged at the end portion of the tension member 5. An anchor portion A1 that increases the projected area when viewed from the longitudinal direction is formed on the tension member 5, the anchor portion A1 is located inside the housing 8, and inside the housing 8, the filler 9 which fixes the anchor portion A1 to the housing 8 is filled. With such a configuration, even if a large tension is applied to the tension member 5, the anchor portion A1 acts as a stopper to prevent the tension member 5 from coming off the housing 8. Furthermore, by hardening the filler 9 with the anchor portion A1 located inside the housing 8, the tension member 5 can be easily fixed to the housing 8, so that the fixation strength of the tension member 5 can be stabilized.

The material of the tension member 5 of the present embodiment is FRP, and the anchor portion A1 is a plurality of branch portions 5a formed by splitting the tension member 5 along the longitudinal direction. With such a configuration, the anchor portion A1 can be easily formed.

Inside the housing 8, a transverse member 10 is arranged across the two tension members 5, and both ends of the transverse member 10 are sandwiched between the branch portions 5a of the respective tension members 5. With such a configuration, the branch portion 5a can be bulged outward to more reliably increase the projected area of the tension member 5 in the longitudinal direction.

Two lock members 11 are locked to each of the two tension members 5, and the two lock members 11 are arranged so as to sandwich the transverse member 10 in the longitudinal direction. With such a configuration, the two tension members 5 and the transverse member 10 can be integrated inside the housing 8, and it is possible to more reliably prevent the tension member 5 from coming off the housing 8.

The method of manufacturing the optical fiber cable 2 of the present embodiment includes an insertion step of inserting the tension member 5 into the insertion hole 8a of the housing 8, a processing step of forming the anchor portion A1 that increases the projected area of the tension member 5 viewed from the longitudinal direction by processing the end portion of the tension member 5, a transfer step of relatively transferring the tension member 5 and the housing 8 to position the anchor portion A1 inside the housing 8, and a fixation step of injecting a filler 9 inside the housing 8 and hardening the filler 9. According to such a manufacturing method, since skillful work is hardly required, the fixation strength of the tension member 5 can be stabilized.

Second Embodiment

Next, the second embodiment according to the present invention will be described; however, the basic configuration is the same as that of the first embodiment. Therefore, the same reference numerals are given to the same configurations, the description thereof will be omitted, and only the different points will be described.

In the present embodiment, the shape of the anchor portion is different from that in the first embodiment.

Figure 7:
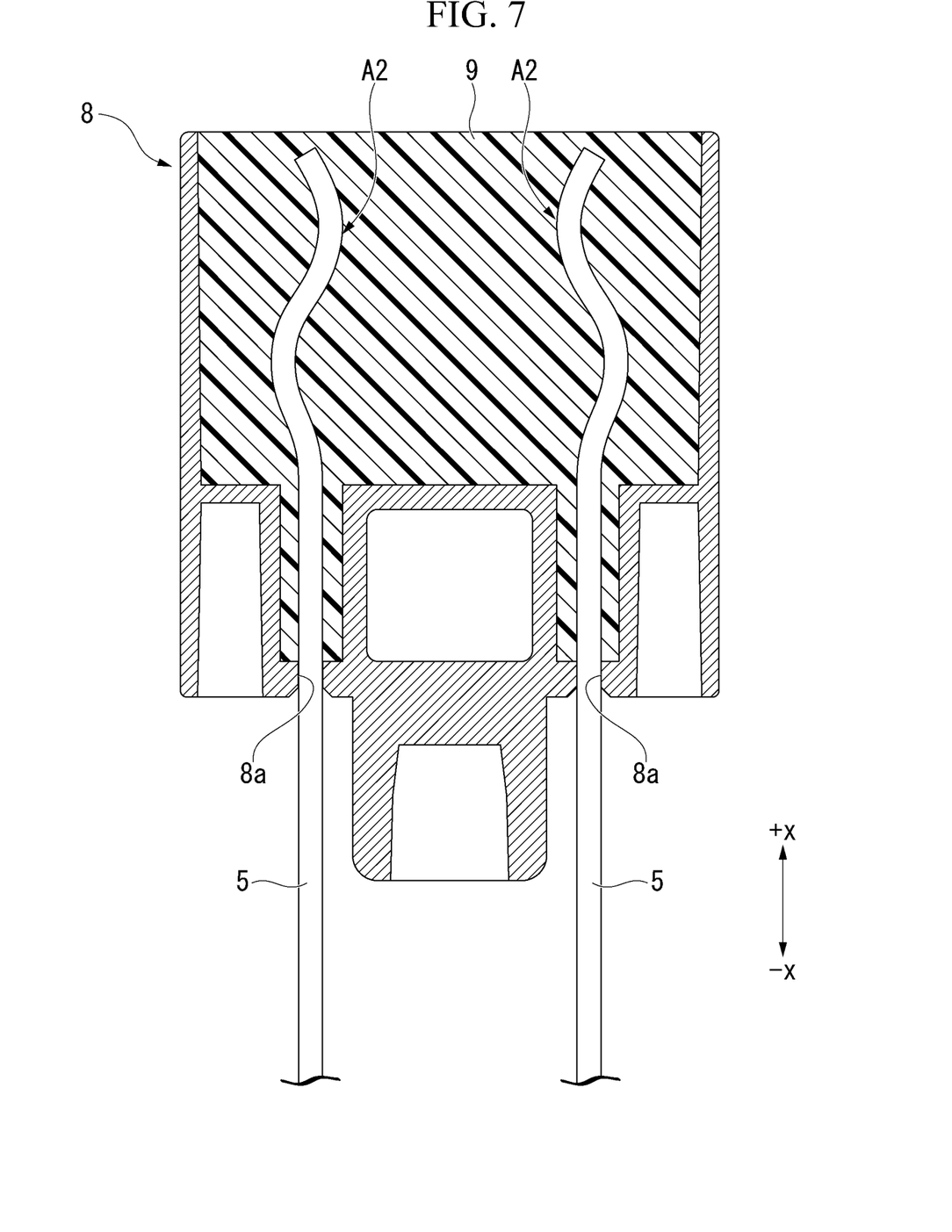
FIG. 7 is a cross-sectional view around the housing of the optical fiber cable according to the second embodiment.

As shown in FIG. 7, the tension member 5 of the present embodiment is bent into a corrugated shape inside the housing 8. In such a bent portion, the projected area of the tension member 5 seen from the longitudinal direction is increased as compared with the unbent portion. That is, the anchor portion A2 in the present embodiment is formed by bending the tension member 5.

Also in the case of the present embodiment, the manufacturing method described in the first embodiment can be employed. However, in the processing step of forming the anchor portion A2, the point that the tension member 5 is bent is different from the first embodiment.

In the example of FIG. 7, the tension member 5 is bent into a corrugated shape; however, the anchor portion A2 may be formed by bending it into another shape. For example, the tension member 5 may be bent into an L-shape, or a single tension member 5 may be used to tie a knot. Alternatively, the two tension members 5 may be tied. In these cases as well, the anchor portion A2 can act as a stopper by increasing the projected area of the tension member 5 seen from the longitudinal direction in the anchor portion A2.

In the case of the present embodiment, the anchor portion A2 can be formed more easily. Furthermore, by devising the bending shape, the effect of preventing the anchor portion A2 from coming off can be easily improved.

The technical scope of the present invention is not limited to the above-described embodiment, and various modifications can be made without departing from the spirit of the present invention.

For example, in the first embodiment described above, one transverse member 10 is arranged in the housing 8 so as to cross the two tension members 5. However, for example, in the case of the optical fiber cable 2 including four tension members 5, two transverse members 10 may be arranged in the housing 8. In this case, one transverse member 10 can be arranged so as to cross the two tension members 5, and the other transverse member 10 can be arranged so as to cross the remaining two tension members 5.

The shape of the anchor portion can be changed as appropriate. For example, in the case of a metal tension member 5, the projected area of the tension member 5 may be increased by processing the tip of the tension member 5 into a nail head shape. In this case, the nail head-shaped portion serves as the anchor portion.

In order to increase the contact area between the tension member 5 and the filler 9, a convex and concave shape may be formed on the surface of the tension member 5 located in the housing 8. In this case, since the tension member 5 and the filler 9 are more firmly fixed, it is possible to more reliably prevent the tension member 5 from coming off the filler 9. Similarly, a convex and concave shape may be formed on the surface of a member such as a lock member 11 or a transverse member 10 that acts as a stopper integrally with the anchor portion A1.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical fiber cable comprising:
   an optical fiber;
   a sheath that accommodates the optical fiber;
   a tension member that extends from an end portion of the sheath and that comprises an anchor portion; and
   a housing disposed at an end portion of the tension member, wherein
   the anchor portion is formed by splitting the tension member into a plurality of branch portions along a longitudinal direction of the optical fiber cable and increases a projected area of the tension member when viewed from the longitudinal direction of the optical fiber cable,
   the anchor portion is inside the housing, and
   the housing is filled with a filler that fixes the anchor portion to the housing.

2. The optical fiber cable according to claim 1, wherein the tension member comprises Fiber Reinforced Plastics (FRP).

3. The optical fiber cable according to claim 2, further comprising:
   another tension member that extends from an end portion of the sheath;
   a transverse member that straddles the two tension members inside the housing and is sandwiched between two of the branch portions of the respective tension members.

4. The optical fiber cable according to claim 3 further comprising:
   two lock members that are respectively locked to the two tension members and sandwich the transverse member in the longitudinal direction.

5. The optical fiber cable according to claim 1, wherein the anchor portion is formed by bending the tension member.

6. A method of manufacturing an optical fiber cable, the method comprising:
   inserting a tension member into an insertion hole on a housing;
   forming an anchor portion on an end portion of the tension member by splitting the tension member along the longitudinal direction, wherein the anchor portion increases a projected area of the tension member when viewed from a longitudinal direction of the optical fiber cable;
   transferring the tension member and the housing to position the anchor portion inside the housing; and
   injecting a filler into the housing and hardening the filler.

* * * * *